United States Patent
Palombini et al.

(10) Patent No.: US 10,340,703 B2
(45) Date of Patent: Jul. 2, 2019

(54) ENERGY STORAGE SYSTEM FOR PHOTOVOLTAIC ENERGY AND METHOD OF STORING PHOTOVOLTAIC ENERGY

(71) Applicant: DYNAPOWER COMPANY LLC, South Burlington, VT (US)

(72) Inventors: John C. Palombini, South Burlington, VT (US); Apurva Somani, Souh Burlington, VT (US)

(73) Assignee: DYNAPOWER COMPANY LLC, South Burlington, VT (US)

( * ) Notice: Subject to any disclaimer, the term of this patent is extended or adjusted under 35 U.S.C. 154(b) by 0 days.

(21) Appl. No.: 16/213,317

(22) Filed: Dec. 7, 2018

(65) Prior Publication Data

US 2019/0115760 A1    Apr. 18, 2019

Related U.S. Application Data

(62) Division of application No. 15/978,585, filed on May 14, 2018.

(60) Provisional application No. 62/506,291, filed on May 15, 2017.

(51) Int. Cl.
| | |
|---|---|
| *H02J 3/38* | (2006.01) |
| *H02M 3/335* | (2006.01) |
| *H02J 7/35* | (2006.01) |
| *H02J 7/00* | (2006.01) |
| *H02J 3/32* | (2006.01) |

(52) U.S. Cl.
CPC ............ *H02J 3/385* (2013.01); *H02J 3/32* (2013.01); *H02J 7/0068* (2013.01); *H02J 7/35* (2013.01); *H02M 3/33584* (2013.01)

(58) Field of Classification Search
CPC ...... H02J 3/32; H02J 3/385; H02J 7/35; H02J 7/0068; H02M 3/33584
See application file for complete search history.

(56) References Cited

U.S. PATENT DOCUMENTS

| 7,783,390 B2 | 8/2010 | Miller |
| 2008/0046387 A1 | 2/2008 | Gopal et al. |

(Continued)

FOREIGN PATENT DOCUMENTS

| EP | 2879262 A1 | 6/2015 |
| WO | 2014/124672 A1 | 8/2014 |

OTHER PUBLICATIONS

International Search Report and Written Opinion dated Sep. 18, 2018; PCT/US2018/032495.

(Continued)

*Primary Examiner* — Daniel Kessie
(74) *Attorney, Agent, or Firm* — Ladas & Parry LLP

(57) ABSTRACT

An energy system for renewable energy applications includes a renewable energy source, a bidirectional inverter connected an AC bus and a DC bus, an energy storage unit connected to the bidirectional DC/DC converter, and a control system comprising one or more controllers coupled to the bidirectional inverter and the bidirectional DC/DC converter. The bidirectional inverter is connected to the renewable energy source and a bidirectional DC/DC converter through the DC bus. The system is configured to capture low power of a photovoltaic (PV) array, energy typically lost to inverter clipping, and through the utilization of ramp rate control.

4 Claims, 9 Drawing Sheets

(56) References Cited

U.S. PATENT DOCUMENTS

| | | | |
|---|---|---|---|
| 2010/0133911 A1* | 6/2010 | Williams | G05F 1/67 307/82 |
| 2010/0156186 A1* | 6/2010 | Kim | H01M 16/003 307/72 |
| 2010/0181837 A1 | 7/2010 | Seeker et al. | |
| 2010/0231045 A1 | 9/2010 | Collins et al. | |
| 2011/0115295 A1 | 5/2011 | Moon et al. | |
| 2011/0215640 A1 | 9/2011 | Donnelly et al. | |
| 2012/0080943 A1* | 4/2012 | Phadke | H02J 3/385 307/24 |
| 2013/0270911 A1 | 10/2013 | Baba et al. | |
| 2014/0001864 A1* | 1/2014 | Nirantare | H01L 31/02021 307/71 |
| 2014/0029308 A1* | 1/2014 | Cojocaru | H01G 4/38 363/13 |
| 2014/0163762 A1 | 6/2014 | Nakamura | |
| 2015/0001932 A1 | 1/2015 | Inoue et al. | |
| 2015/0109827 A1* | 4/2015 | Poshtkouhi | H02M 3/33584 363/17 |
| 2015/0350391 A1 | 12/2015 | Miyake et al. | |
| 2016/0006250 A1* | 1/2016 | Ramond | H01L 31/02021 307/82 |
| 2016/0209857 A1 | 7/2016 | Nakasone | |
| 2016/0322835 A1 | 11/2016 | Carlson et al. | |
| 2016/0370814 A1 | 12/2016 | Hanley et al. | |
| 2016/0372926 A1* | 12/2016 | Pahlevaninezhad | H02J 3/382 |
| 2017/0104449 A1 | 4/2017 | Drees | |
| 2017/0133879 A1 | 5/2017 | Eckhardt et al. | |

OTHER PUBLICATIONS

USPTO RR dated Sep. 11, 2018 in connection with U.S. Appl. No. 15/978,585.

USPTO NFOA dated Dec. 27, 2018 in connection with U.S. Appl. No. 15/978,585.

* cited by examiner

ENERGY STORAGE SYSTEM FOR PHOTOVOLTAIC ENERGY AND METHOD OF STORING PHOTOVOLTAIC ENERGY

BACKGROUND OF THE INVENTION

Field of the Invention

The present invention relates to an energy storage system and method for capturing photovoltaic (PV) energy in energy storage.

Electric power conversion devices and associated control systems may be used to interface various energy resources. For example, a power system can include a variety of interconnected distributed energy resources (e.g., power generators and energy storage units) and loads. The power system may also connect to a utility grid or a microgrid system. The power system employs the electric power conversion to convert power between these energy resources (e.g., AC/DC, DC/DC, AC/AC and DC/AC).

Power systems may be designed to supply power, regulate power, and transfer power from one source to another with the goal of providing continuous power to a load. It is desirable to provide power in the most efficient manner possible, so that the maximum possible amount of energy generation is used. However, topology limitations and design requirements can be limitations the energy generation that is ultimately used. Conventional PV installations underutilize power generated by a PV array by failing to capture low voltage energy generated by a PV array when the PV array voltage is lower than the wake up voltage of an inverter, failing to capture "clipped" energy, and by failing to supply energy to the grid in consideration of curtailment or energy price.

BRIEF SUMMARY OF THE INVENTION

Embodiments of the present invention include apparatus and methods for utilizing power generated by a PV array.

In one aspect, a power system for capturing low voltage energy from a power source includes: the power source coupled to a DC bus; a DC/DC power converter coupled to the DC bus and an energy storage device; a power inverter coupled to the DC bus and an AC bus; and a control system. The control system may include one or more controllers configured to: monitor a voltage produced by the power source; determine whether the power source is producing a voltage greater than a first predetermined threshold; determine whether the power source is producing a voltage less than a second threshold when it is determined that the power source is producing a voltage greater than the first predetermined threshold; when it is determined that the power source is producing a voltage between the first threshold and the second threshold: control the DC/DC power converter to operate in an MPPT mode and store energy generated by the power source in the energy storage device; and control the power inverter not to operate in an MPPT mode; and when it is determined that the power source is producing a voltage greater than or equal to the second threshold: control the power inverter to operate in an MPPT mode and supply the energy generated by the power source to a power grid through the AC bus; and control the DC/DC power converter not to operate in an MPPT mode.

The first predetermined threshold may be equal to expected losses in the DC/DC power converter.

The power inverter have a wake up voltage being a voltage magnitude that a voltage at the DC bus must reach for the power inverter to be operational, and the second predetermined threshold is equal to the wake up voltage of the power inverter.

The voltage produced by the power source may be monitored continuously, and the control system may continuously control the DC/DC power converter and the power inverter to transition between operating in an MPPT mode and not operating in an MPPT mode.

In determining whether the power source is producing a voltage less than the second predetermined threshold, the control system may be further configured to monitor the voltage at the DC bus.

A sensor sensing the voltage at the DC bus and transmitting the sensed voltage to the power system may also be included.

In another aspect, a power system for capturing clipped energy from a power source may include the power source coupled to a DC bus; a DC/DC power converter coupled to the DC bus and an energy storage device; a power inverter coupled to the DC bus and an AC bus; and a control system. The control system may include one or more controllers configured to: monitor an output power of the power inverter; compare the output power of the power inverter to a predetermined threshold; when the output power of the power inverter is greater than the predetermined threshold, control the DC/DC power converter to store output power of the power source that exceeds the predetermined threshold in the energy storage.

The predetermined threshold may be a maximum power rating of the power inverter.

The output power of the power inverter may be monitored continuously, and the control system may continuously control the DC/DC power converter and the power inverter to transition between storing and not storing output power of the power source in the energy storage.

In an aspect, a power system for selectively dispatching energy from a power source may include: the power source coupled to a DC bus; a DC/DC power converter coupled to the DC bus and an energy storage device; a power inverter coupled to the DC bus and an AC bus; and a control system. The control system may include one or more controllers configured to: monitor parameters external to the power system; and selectively control the DC/DC power converter to store power generated by the power source in the energy storage in accordance with the monitored parameters.

The parameters external to the power system may include a PV energy pricing signal for energy supplied to a power grid through the AC bus; and a curtailment signal for ceasing or reducing an amount of energy supplied to the power grid.

The DC/DC power converter may store power generated by the power source in the energy storage when a price in the PV energy pricing signal is below a predetermined threshold.

The DC/DC power converter may supply energy stored in the energy storage to the power grid through the power inverter when a price in the PV energy pricing signal is equal to or greater than the predetermined threshold.

The parameters external to the power system may be monitored continuously, and the control system may continuously control the DC/DC power converter and the power inverter to transition between storing and not storing output power of the power source in the energy storage.

In an aspect, a power system for controlling a ramp rate may include: a power source coupled to a DC bus; a DC/DC power converter coupled to the DC bus and an energy storage device; a power inverter coupled to the DC bus and an AC bus; and a control system. The control system may include one or more controllers configured to monitor an output power of the power inverter and a rate of change of the output power of the power inverter; compare the rate of change of the output power of the power inverter with a pre-defined ramp rate; and control the DC/DC converter to charge or discharge the energy storage when the rate of change of the output power of the power inverter differs from the pre-defined ramp rate by more than a predetermined amount.

The output power of the power inverter and a rate of change of the output power of the power inverter may be monitored continuously, and the control system may continuously control the DC/DC power converter to charge or discharge the energy storage until the rate of change of the output power of the power inverter no longer differs from the pre-defined ramp rate by more than the predetermined amount.

The DC/DC power converter may supply power to the energy storage when the rate of change of the output power of the power inverter is greater than the pre-defined ramp rate by more than the predetermined amount.

The DC/DC power converter may discharge power from the energy storage to a power grid through the power inverter when the rate of change of the output power of the power inverter is less than the pre-defined ramp rate by more than the predetermined amount.

BRIEF DESCRIPTION OF THE FIGURES
(NON-LIMITING EMBODIMENTS OF THE DISCLOSURE)

DETAILED DESCRIPTION

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Embodiments of the present invention include systems and methods for capturing additional energy from solar PV installations that typically goes to waste. Embodiments of the present invention include interfacing storage with PV power generation for capturing low voltage energy of a PV array. Other embodiments of the present invention include interfacing storage with PV power generation for capturing energy losses from inverter clipping. Other embodiments of the present invention include interfacing storage with PV power generation for providing dispatchable PV power. Other embodiments of the present invention include interfacing storage with PV power generation for providing ramp rate control.

Figure 1:
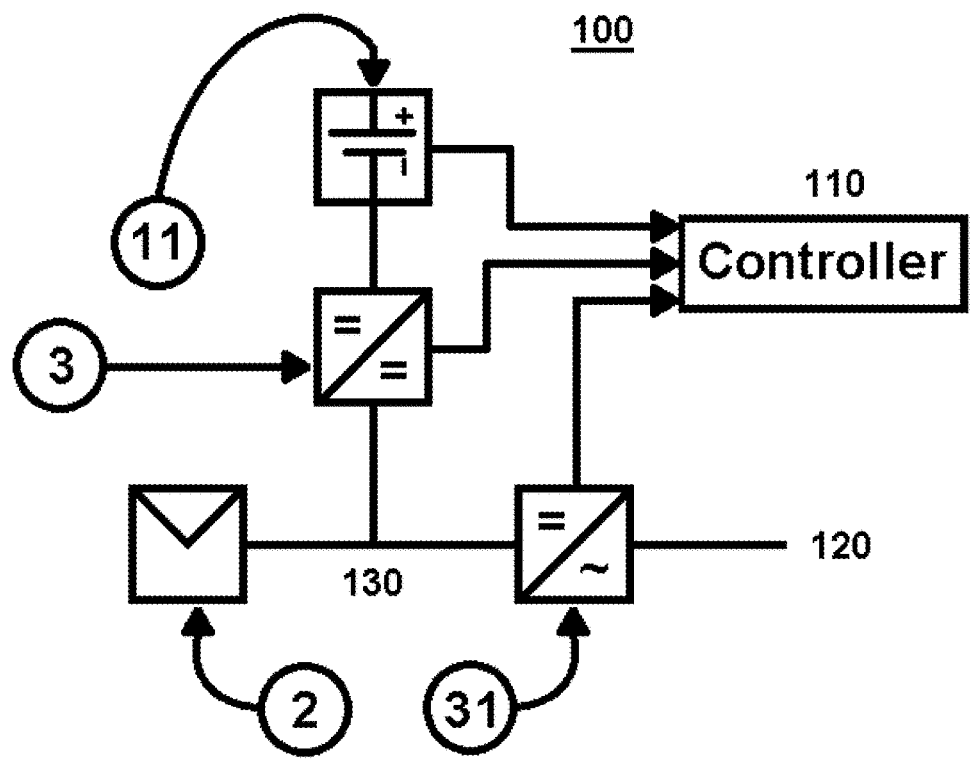
FIG. 1 shows a power system employing an energy storage system for photovoltaic energy according to an embodiment of the present invention.

Referring to FIG. 1, a PV plus storage generation system 100 includes a PV array 2, a PV inverter 31, energy storage 11, a DC/DC converter 3, a controller 110, a DC bus 130 and an AC bus 120 that may be connected to a utility grid, local loads, and/or a microgrid.

In an embodiment, the control system 110 for the PV plus storage generation system 100 may include a controller 110 that coordinates the operation of the converter 3 and the inverter 31. In another embodiment, the control system 110 for the PV plus storage generation system 100 may include separate controllers for each of the DC/DC converter 3 and the PV inverter 31. In the case in which there are separate controllers for the DC/DC converter 3 and the PV inverter 31, the control system 110 may include a master controller which coordinates with the controllers of the DC/DC converter 3 and the PV inverter 31.

The PV inverter 31 is connected to an AC bus 120 on the AC side of the inverter. The AC bus 120 is capable of being coupled to a utility grid, microgrid, loads, and/or other AC connections. Preferably, the DC side of the inverter 31 is connected to both the DC/DC converter 3 and the PV array 2. For brevity, the array is shown as a single connection, but it should be understood that in embodiments of the present invention it is possible that panels are connected in strings with the strings being connected in a recombiner box prior to the inverter. Furthermore, in an embodiment, the PV inverter 31 may be capable of more than one Maximum Power Point Tracking (MPPT) inputs in which case multiple converters 3 may be employed.

Preferably, the DC/DC converter 3 is connected to the DC input of the PV inverter 31 and also to the energy storage 11. Energy storage may include, for example, a battery, a battery bank, etc.

In an embodiment, the PV inverter 31 may, e.g., be of a central or string type.

Preferably, the battery 11, DC/DC converter 3, control system 110, and PV inverter 31 are collocated within close proximity of one another to minimize costs by reducing cable lengths; and are located in a position to minimize any shading of the solar panels such as the north side of the array. However, it should be understood that the present invention is not limited as such. Furthermore, embodiments of the present invention including the storage 11, DC/DC converter 3, and controller 110 may be installed with new construction or retrofitted to an existing solar PV installation.

In embodiments of the present invention, the control system 110 can be connected to the DC/DC converter 3, energy storage 11, and PV inverter 31 through a means of communication such as Modbus TCP over copper or fiber, or wirelessly through short range wireless communication, wireless local area networking, etc. Additional communications connections may be made to any of the assets of the power system by the owner, operator, or a third party data collection service to monitor the operation and performance of the system. These remote connections may be made, e.g., via cellular, satellite, hardwired connection, etc.

Figure 4:
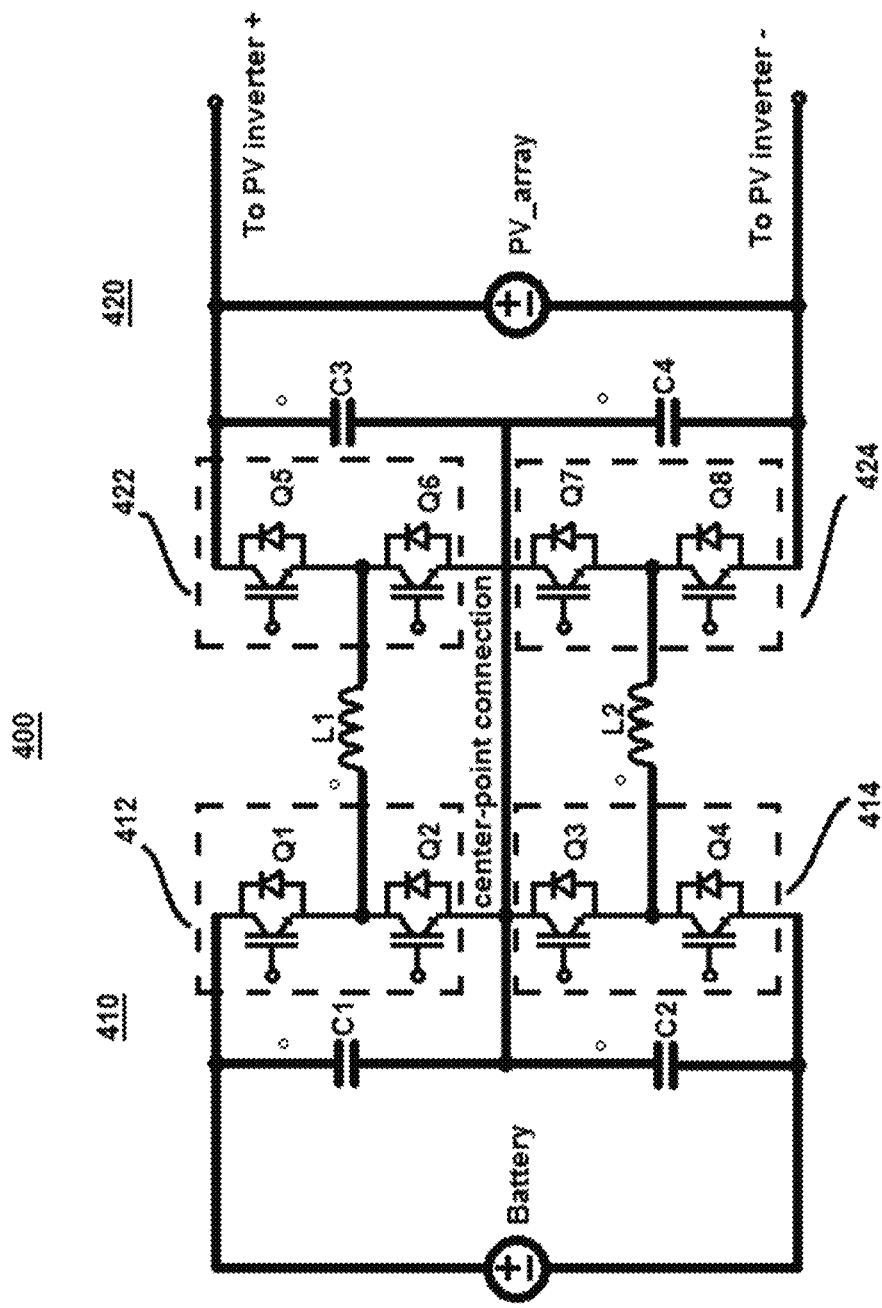
FIG. 4 is a schematic diagram of an exemplary DC/DC converter according to an embodiment of the present invention.
Figure 5:
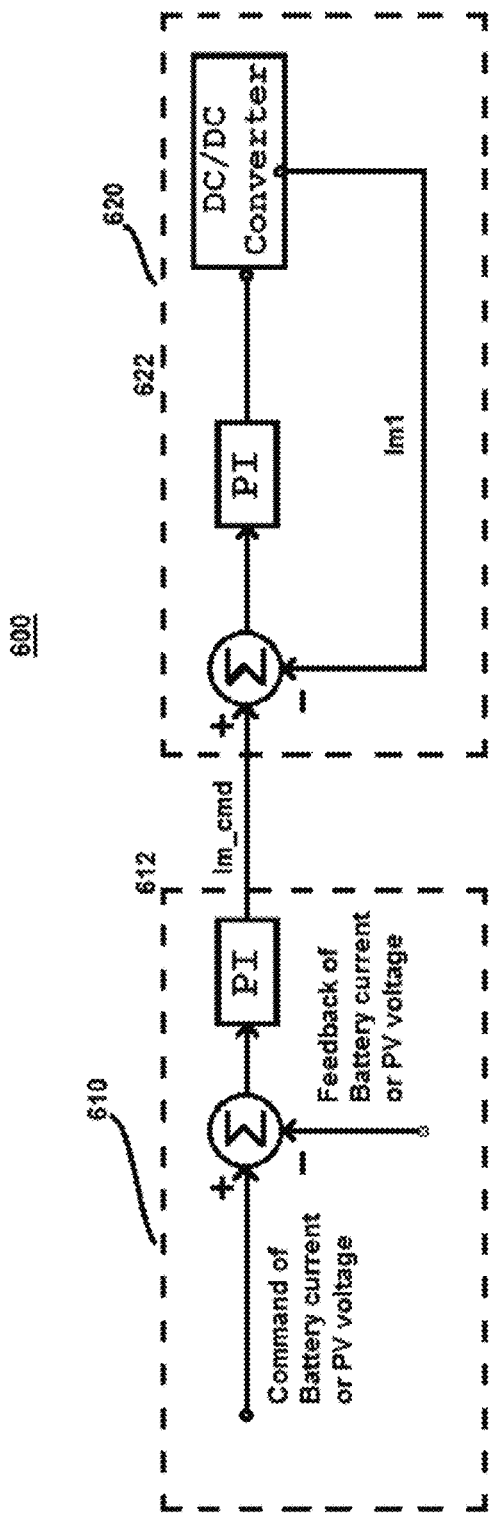
FIG. 5 is a control structure for a DC/DC converter according to an embodiment of the present invention.

FIGS. 4 and 5 show an exemplary bidirectional DC/DC converter topology and control structure that could be used as the bidirectional DC/DC converter 3 shown in FIG. 1. It should be understood the DC/DC converter 3 is not limited to that shown in FIGS. 4 and 5, and could be another DC/DC converter topology so long as the converter is capable of bidirectional power flow. The DC/DC converter of FIGS. 4 and 5 is described in detail in U.S. application Ser. No. 15/895,565, which is incorporated by reference in its entirety.

Referring to FIG. 4, a DC/DC converter 400 according to an embodiment of the present invention may include a first conversion stage 410 and a second conversion stage 420 connected to each other. The first and second conversion stages 410, 420 form a bi-directional DC/DC converter (i.e., the power flow is bidirectional). The magnitude of the voltage on the first converting stage 410 can be higher or lower than or roughly equal to the magnitude of the voltage on the second converting stage. Thus, either side of the DC/DC converter 400 can be used as a buck or a boost converter.

In an embodiment, the first conversion stage 410 is operative to convert the input/output voltage corresponding to the battery to a desired magnitude at the input/output corresponding to the PV array when the magnitude of the voltage of the input/output corresponding to the battery is higher than the magnitude of the voltage at the input/output corresponding to the voltage over the PV array. The second conversion stage 420 is operative to convert the input/output voltage corresponding to the PV array to a desired magnitude at the input/output corresponding to the battery when the magnitude of the voltage of the input/output corresponding to the PV array is greater than the magnitude of the voltage at input/output corresponding to the battery.

In an embodiment, the DC/DC converter 400 comprises a cascaded connection of series H-bridges. The first conversion stage 410 comprises a first half bridge 412 and a second half bridge 414 connected in series. Each of the first half bridge 412 and the second half bridge 414 may comprise a pair of switches Q1, Q2 and Q3, Q4. The second converting stage 420 comprises a third half bridge 422 and a fourth half bridge 424 that are connected in series. Each of the third half bridge 422 and the fourth half bridge 424 may comprise a pair of switches Q5, Q6 and Q7, Q8, respectively.

In an embodiment, the first conversion stage 410 and the second conversion stage 420 are interfaced using inductors L1 and L2. In another embodiment, the first and second inductors L1 and L2 may be replaced by an isolation transformer T1 as shown in FIG. 5.

In the embodiment in which the first and second conversion stages 410 and 420 are interfaced by the inductors L1 and L2, the DC/DC converter 400 may further include an optional center point connection. The center-point connection 450 may be advantageous, for example, in a scenario in which the input/output is connected to energy storage (e.g., battery/batteries) in that the noise on the battery terminals is reduced by the neutral center-point connection 450. However, there is a design trade-off to the center-point connection 450 in that the ripple performance (i.e. ripple current and voltage on the battery and PV ports) is compromised to some extent.

In an embodiment, each of the half bridges 412, 414, 422, 424 may be close coupled to a DC bus capacitor C1-C4 for filtering and semiconductor voltage overshoot reduction. For example, capacitor C1 may be a filter capacitor for the half-bridge formed by Q1 and Q2. Each of these capacitors C1-C4 may be an individual capacitor or may be a series and parallel combination of several discrete capacitors to reach the appropriate rating.

In an embodiment, switches Q1-Q8 are semiconductor switches with back-body diodes. Examples of semiconductor switches that may be used for Q1-Q8 include, but are not limited to, IGBT, MOSFETs, etc.

FIG. 5 shows a control structure for a DC/DC converter according to an embodiment of the present invention.

Referring to FIG. 5, the control structure 600 includes an outer control loop 610 and an inner control loop 620. The outer control loop 610 controls one of the interface inductor currents (e.g. Im1), and the inner control loop 620 controls the magnitude of the battery/PV current or the magnitude of the battery/PV voltage.

In the embodiment shown in FIG. 5, the controller parameters (e.g., the two PI parameters) may be tuned to adapt to hardware parameters. The tuning depends on a few factors, for example: 1) Speed of response required—the control bandwidth of the system—e.g., whether it is desirable for the converter to reach rated current in 1 ms or 100 ms; and 2) the hardware parameters of the system—e.g., inductance, capacitance and switching frequency values.

The outer control loop 610 receives as inputs a command of battery current or PV voltage and feedback of battery current or PV voltage. The command of battery current or PV voltage and feedback of battery current or PV voltage may be the desired magnitude of battery current or desired magnitude of PV voltage. The feedback of battery current or PV voltage is the actual magnitude of the battery current or actual magnitude of the PV voltage. The desired magnitude is then compared to the actual magnitude by, for example, taking the difference between the desired magnitude and actual magnitude. This difference is inputted into a controller 612 for controlling one of the interface inductor currents over one of the inductors. The controller 612 then outputs the current command Im_cmd for the interface inductor current to the inner control loop 620. Here, the current command Im_cmd may be a desired magnitude for the interface inductor current that is compared to the actual magnitude of the interface inductor current.

In the embodiment shown in FIG. 5, the controllers 612 and 622 are proportional-integral (PI) controllers. However, it should be understood that these controllers are not limited to PI controllers, and in fact, the controllers may be any closed loop controller including, e.g., a proportional-integral-derivative (PID) controller and a proportional (P) controller.

The inner control loop 620 receives as inputs the inductor current command Im_cmd and the actual magnitude of the inductor current Im1. The inductor current command Im_cmd is then compared to the inductor current Im1 by, for example, taking the difference between the inductor current command Im_cmd and the inductor current Im1. This difference is then inputted into a controller 622 for calculating the duty value of the switching signals that are input to switches Q1-Q8. Controller 322 outputs the duty value of the switching signals to the DC/DC converter. The duty value affects the duty cycle of the signals to the switches, which affects the magnitude of the step up/step down of the DC/DC converter 400. The duty ratio depends on the ratio of the voltages on either side of the DC/DC converter 400.

The control structure 600 may be embodied on a controller such as a digital signal processor (DSP), field programmable gate array (FPGA), etc. However, is should be understood the controller is not limited to these, and can be any type of processor. In addition, the control structure 600 may be embodied on a single controller or a plurality of controllers (e.g., a different controller for the outer and inner loop).

As noted above, the DC/DC converter 3 is not limited to this particular configuration, and may be any DC/DC converter capable of bidirectional power flow.

Low Voltage Energy

Figure 2:
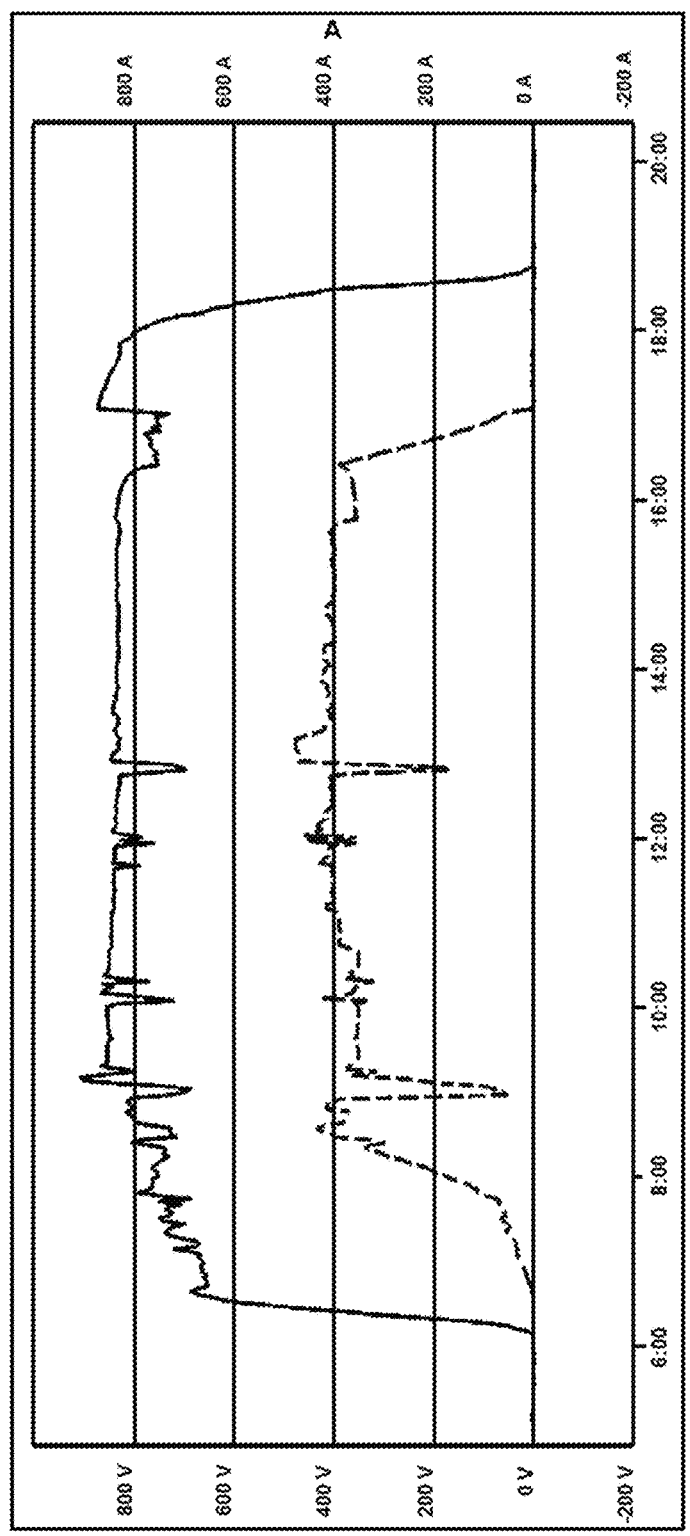
FIG. 2 illustrates solar array DC voltage and current from the solar array over the course of a photovoltaic (PV) inverter operation.

FIG. 2 illustrates solar array DC voltage and current from PV array 2 over the course of PV inverter 31 operation. FIG. 2 is provided to aid in the explanation of an embodiment of the present invention in which the PV plus storage generation system 100 implements a DC/DC converter 3 in order to store low voltage energy that is below a certain threshold (i.e., a 'wake up' voltage).

With a traditional PV inverter topology the PV inverter must wait for a minimum DC voltage to be generated by the solar field (e.g., solar array 2) in order to start producing power. This may be referred to as the 'wake up' voltage. In the embodiment shown with reference to FIGS. 1 and 2, the addition of the DC/DC converter allows the system to extract energy from the PV array when the PV array voltage is lower than the inverter's wake up voltage and the inverter is not operating (i.e., where the PV array 2, DC/DC converter 3, and the DC side of the inverter 31 are connected).

FIG. 2 illustrates a typical PV inverter operation, with the black trend (i.e., the top trend) being the solar array DC voltage and the grey trend (i.e., the bottom trend) being the current from the solar array. Topology limitations will limit a typical PV inverter from trying to convert energy from the solar arrays to grid energy until the PV array reaches the wake up voltage. When referring to FIG. 2, it can be noted that the inverter is not able to produce power from the array until the array voltage reaches the wake up voltage, in this case roughly 700 VDC. Accordingly, from the point at which sunlight is incident on the solar panels of the solar array 2 to the point at which the array reaches the wake up voltage, there is energy available from the panels. Traditional implementations are unable to capture energy/power available below the threshold of the wake-up voltage.

In an embodiment, for low voltage capture the DC/DC converter 3 operates with a maximum power point tracking mode and stores the PV generated energy into the energy storage 11. The captured energy may then be used in a variety of ways. For example, the low voltage captured energy may be discharged to the grid 120 via inverter 31 at a later time or may be used at a later time to power local loads.

Figure 6:
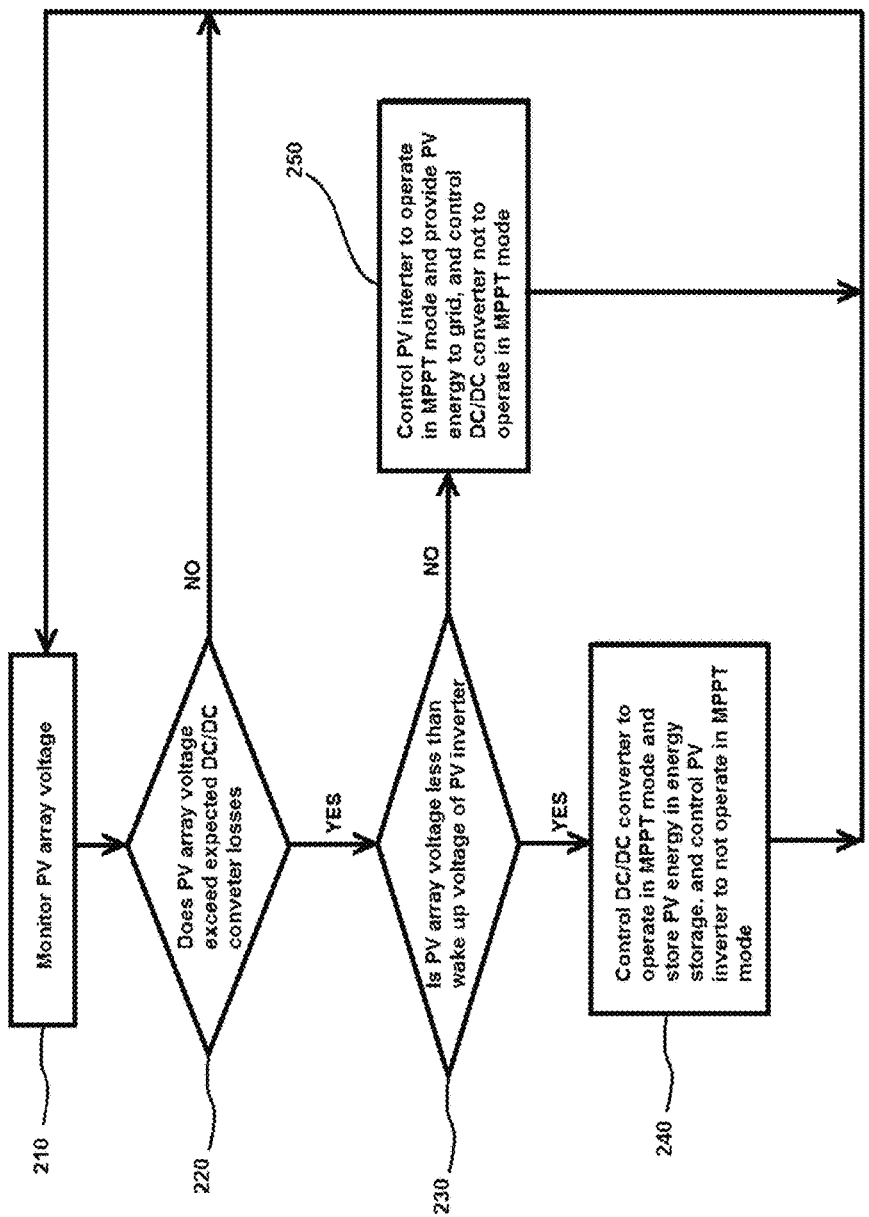
FIG. 6 is a flowchart illustrating a low voltage energy capture method implemented by an energy storage system according to an embodiment of the present invention.

The control system 110 controls the operation of the DC/DC converter 3 and PV inverter 31 so that the system 100 captures the low voltage energy. For example, as shown in FIG. 6, in an embodiment, at startup, the control system:

210: Monitor the voltage produced by the PV array.

220: Determines whether the PV array 2 is producing a voltage greater than a first predetermined threshold. According to an embodiment, the first predetermined threshold is set to be equal to the expected losses in the DC/DC converter 3. The control system 110 determines whether the PV array 2 has enough available power by using the voltage sensed on DC bus 130 and optional solar irradiance sensors. This is done to ensure that the power available in the PV array 2 is more than what would be lost in the DC-DC converter 3 when it is operating. If the DC-DC converter 3 loses more power than what it available in the PV array 2 during low voltage operation, then the energy storage 11 may end up discharging.

230: When the control system 110 determines that the PV array 2 is producing a voltage greater than the first predetermined threshold, the control system 110 then determines whether the PV array 2 is producing a voltage that is less than a second predetermined threshold. In an embodiment, this second predetermined threshold for voltage is set to be equal to the wake up voltage of the PV inverter 31. The control system 110 determines whether the PV array 2 is producing a voltage that is less than the second predetermined threshold by monitoring the voltage on DC bus 130 to determine whether DC bus 130 voltage is less than the wake up voltage. Such monitoring may take place through the use of sensors that sense the magnitude of voltage on the DC bus 130.

240: When the control system 110 determines that the PV array 2 has available power that is greater than a first predetermined threshold and is producing a voltage that is less than a second predetermined threshold, the control system 110 controls the DC/DC converter 3 to operate with an MPPT mode and stores the PV generated energy into the energy storage 11, and the control system 110 controls the PV inverter 31 not to operate with an MPPT mode.

While control system 110 controls DC/DC converter 3 to operate with an MPPT mode, the control system 110 continues to monitor the PV array voltage to determine whether the PV array voltage has reached the second predetermined threshold (e.g., the wake up voltage).

250: When it is determined that the PV array voltage has reached the second predetermined threshold, the control system 110 controls the PV inverter 31 to operate with an MPPT mode so that energy produced by the PV array is provided to the grid 120. When the controller 110 puts the inverter 31 into MPPT mode, the control system 110 stops MPPT mode for the DC/DC converter 3.

Once the PV array voltage has reached or surpasses the second predetermined threshold, the control system 110 continues to monitor the PV array voltage to determine whether its magnitude falls below the second predetermined threshold. This may occur when clouds, dust, or other objects interfere with the sunlight incident on the PV array 2, or when the sun begins to set. When the PV array voltage falls below the second predetermined threshold, the control system 110 again controls the DC/DC converter 3 to operate with an MPPT mode so that energy is stored in energy storage 11, and stops MPPT mode for the PV inverter 31.

Once the PV array voltage falls below the second predetermined threshold, the control system 110 continues to monitor the PV array voltage to determine whether its magnitude again reaches the second predetermined threshold, at which point the control system will again control the PV inverter 31 to operate with an MPPT mode so that energy produced by the PV array 2 is provided to the grid 120 and stops MPPT mode for the DC/DC converter 3.

Although the above method is described for a case in which the DC/DC converter 3 is connected to energy storage 11, it should be understood that the present invention is not limited to this specific case. For example, in another embodiment, a similar control method is applied by the control system 110 to a DC/DC converter 3 having one side coupled to a PV array 2 and the other side coupled to the PV inverter 31. In this case, the DC/DC converter 3 is not used to store energy, but rather, the DC/DC converter 3 boosts the voltage to exceed the wake up voltage of the PV inverter 31 in low voltage array PV output situations. Thus, when the control system determines that the PV voltage is less than the second threshold, the control system controls the DC/DC converter 3 to boost the voltage above the wake up voltage of the PV inverter 31.

Inverter Clipping Capture

Figure 3:
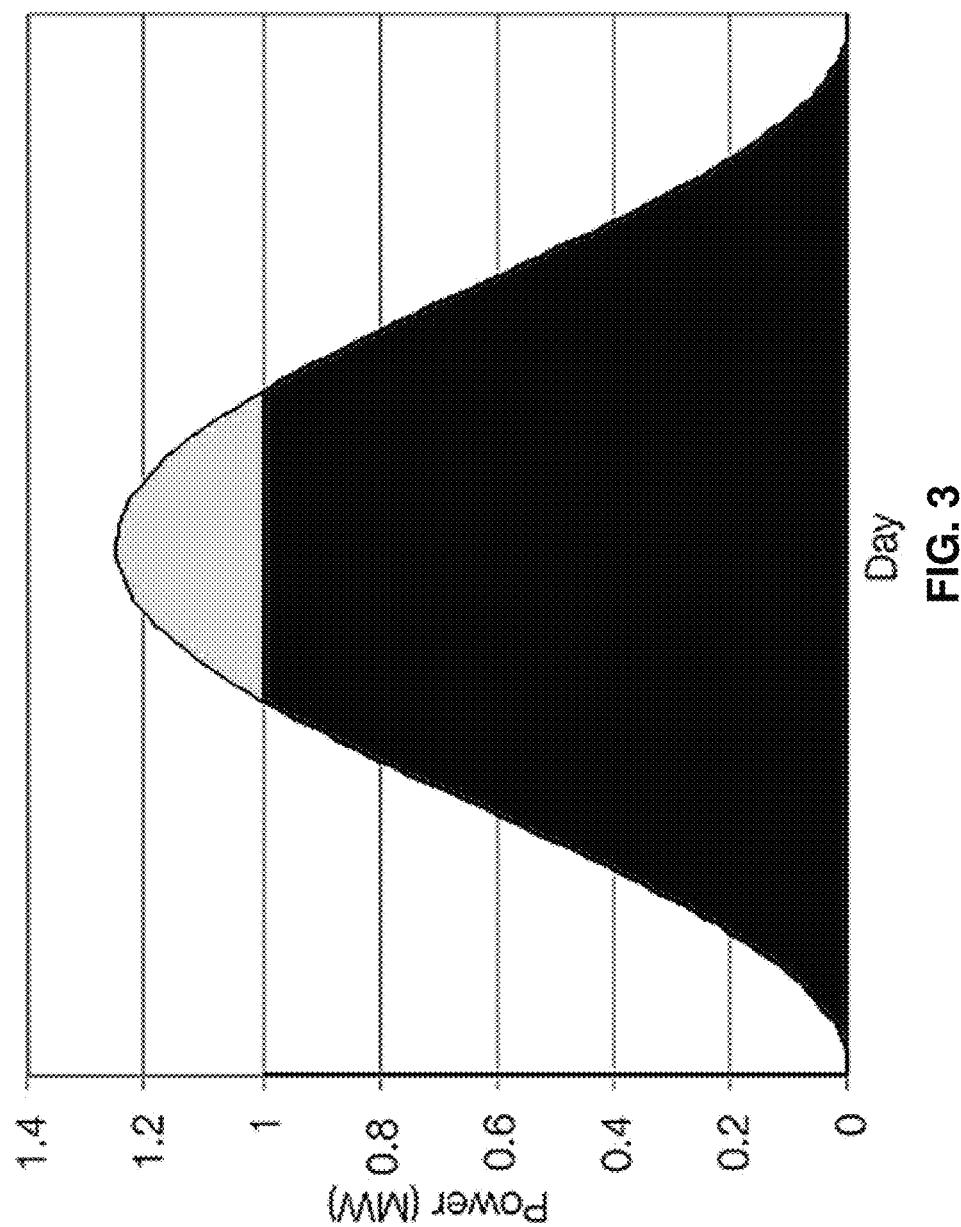
FIG. 3 illustrates capture of energy potentially lost during inverter clipping.

FIG. 3 illustrates capture of energy potentially lost during inverter clipping.

Inverter loading ratio (ILR) is defined as the ratio of installed DC PV power to AC inverter (e.g., inverter 31) rating. An ILR of 1 produces a continuous parabola when graphing the power output of the solar system over the course of the day—assuming ideal irradiance free of cloud cover and other variations. The higher the ILR, the quicker the system will reach its output power rating. For example, an ILR of 1 will have a slower ramp up to the inverter maximum output power rating as compared to a larger ILR. In contrast, a high ILR will produce a steeper ramp and quicker time to reach the inverter maximum output power rating.

In order to maximize energy production from solar PV installations, an ILR greater than 1 may be deployed, with ILR values of 1.2 to 1.3 being common and ILR of greater than 2 not uncommon. However, when employing the higher ILR values, while the power output will reach inverter rating more quickly, inverter clipping occurs. In the example shown in FIG. 3, there are approximately 1.3 MW of PV panels and a 1 MW PV inverter (ILR=1.3). This configuration limits the PV output power to 1 MW and will harvest the energy of the dark grey shaded area. However, this configuration is unable to capture all the energy available above 1 MW shown as the light grey area. In the embodiment shown in FIG. 1, the converter and control system stores the 'clipped' energy into the energy storage 11, which can then be dispatched at a later time.

Figure 7:
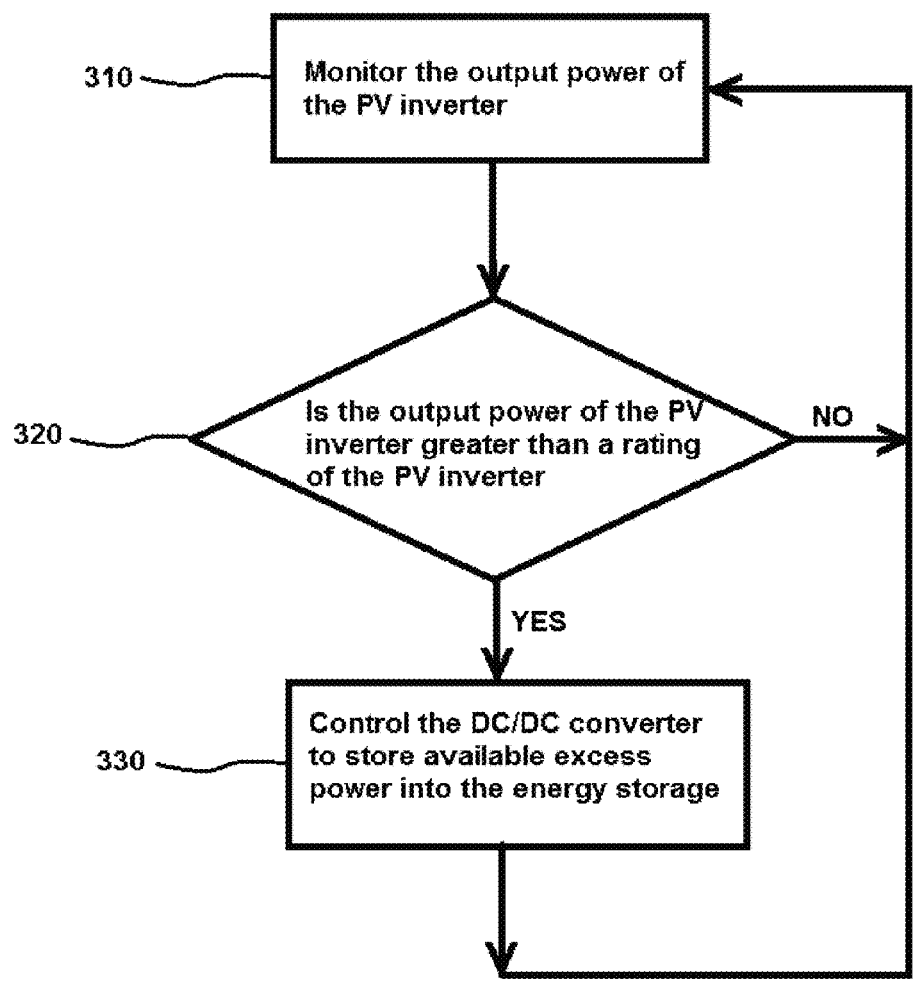
FIG. 7 is a flowchart illustrating an inverter clipping capture method implemented by an energy storage system according to an embodiment of the present invention.

The control system 110 controls the operation of the DC/DC converter 3 and PV inverter 31 so that the system 100 captures the clipped energy. For example, as shown in FIG. 7, in an embodiment, the control system:

310: Monitors the output power of the PV inverter 31. In an embodiment, the control system 110 may monitor the voltage on the AC bus 120. Such monitoring may take place through the use of sensors that sense the magnitude of voltage and current output by the PV inverter 31. Such a sensor may, for example, be placed at the output of the PV inverter 31 or within a case of the PV inverter. In an embodiment, the sensor may be incorporated into the PV inverter.

320: Determine whether the PV array power has reached a predetermined threshold. In an embodiment, the control system 110 has stored therein the PV inverter 31 rating, and sets the PV inverter 31 rating as the predetermined threshold. For example, if there is a 1 MW solar inverter and 1.5 MW of solar panels, the control system monitors the magnitude of the output power of the solar inverter 31, and once the solar inverter becomes power limited at 1 MW, the control system 110 controls the DC/DC converter 3 to store any available excess power into the energy storage 11.

330: After the output power exceeds the predetermined threshold, the control system 110 continues to monitor the output power of PV inverter 31 to determine whether the output power falls below the predetermined threshold, after which there is no longer excess power to be stored.

Dispatchable PV

In an embodiment, the control system 110 stores energy produced by the PV array 2 in the energy storage 11 so that it can be dispatched a later time. The energy can then be used when the solar installation is not curtailed or when the offtake (e.g., power company, large industrial facility, town, etc.) will pay a premium for energy.

Figure 8:
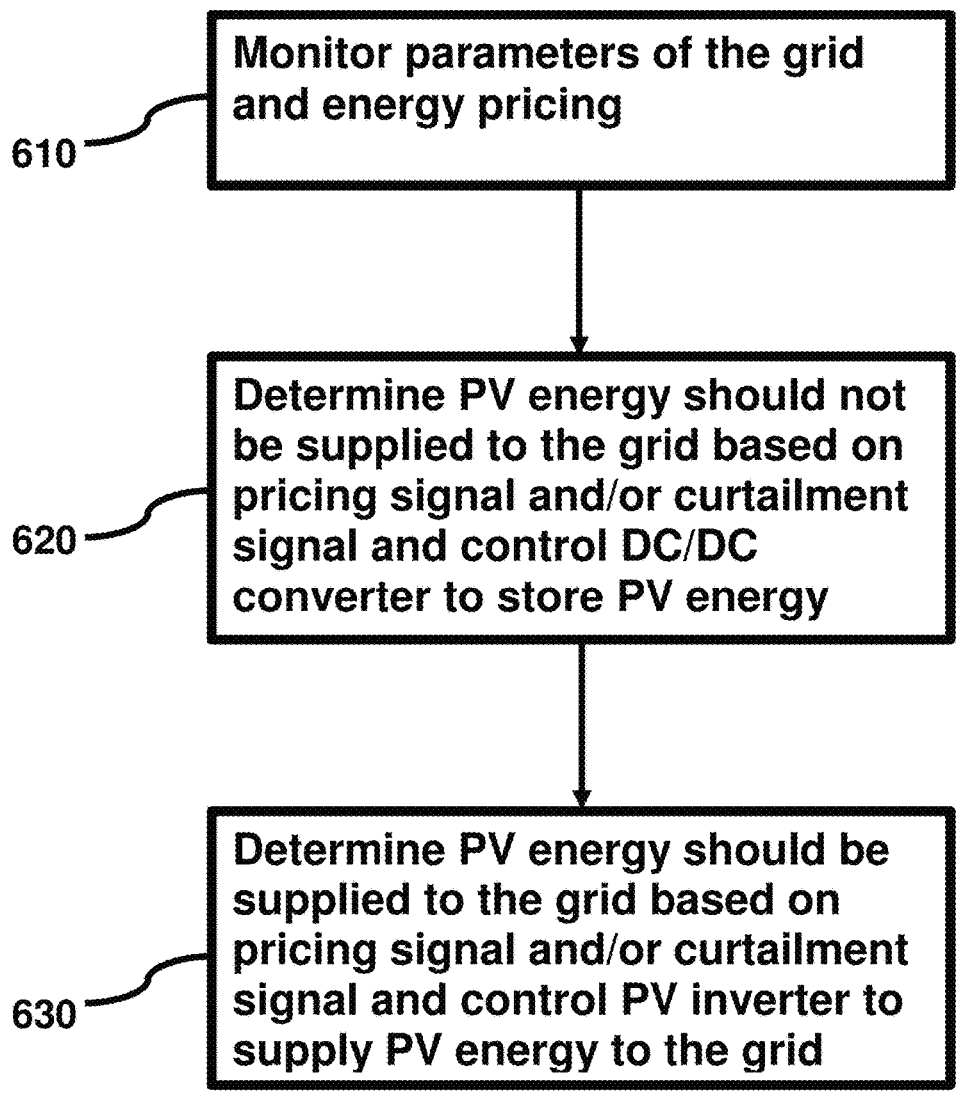
FIG. 8 is a flowchart illustrating a method for providing dispatchable PV power implemented by an energy storage system according to an embodiment of the present invention.

For example, in an embodiment, as shown in FIG. 8, the control system 110:

710: Monitors the grid parameters and energy pricing to determine whether it is beneficial to charge the energy storage 11 using PV energy instead of sending PV energy to the grid. For example, the control system 110 may receive pricing signal for energy supplied to the grid, or the control system 110 may receive a signal to reduce or stop supplying solar generation to the grid from a utility or other entity.

720: Determines that solar generated energy should not be supplied to the grid, the control system 110 controls the DC/DC converter 3 to store power from the PV array 2 in the energy storage 11. The control system 110 may then determine that curtailment ends by, for example a predetermined amount of time passing or by receiving a signal from the entity (e.g., the utility) or that energy price has increased that makes supplying power to the grid more profitable.

730: Once curtailment ends, or energy price increases, the control system 110 may control the PV inverter 31 to provide power to the grid 120, which may include local loads, the utility, large industrial facility, town, etc.

This embodiment is advantageous in that if the solar array 2 at a solar installation is curtailed (even if curtailment were as long as a day), instead of total loss, as much energy as possible is stored in the energy storage. Then at a later point (e.g., nighttime) when the solar installation is offline because there is no sunlight, the installation is able to discharge the energy storage 11 to the grid.

Ramp Rate Control

PV power production is dependent upon sunshine, and thus, PV power production can fluctuate with the passing of clouds or other shading events. When these shading events occur down-ramping happens. When the sunlight returns up-ramping happens. If there is sharp up-ramping or down-ramping, damage may be done to the power system or other systems that are connected to the power system (e.g., a high ramp rate could cause over/under frequency events which would cause system failures). For example, if substantial cloud coverage comes while a solar farm is at full power, the output power from the solar farm may go from at or near maximum power to a very low value, and the grid and loads are not well equipped to handle a very fast rate of change of power. In an embodiment, the control system 110 and DC/DC converter 3 mitigate both up-ramping and down-ramping events caused by shading by partially charging during up-ramping events and partially discharging during down-ramping events to maintain a pre-defined ramp rate (rate of change of power with respect to time).

Figure 9:
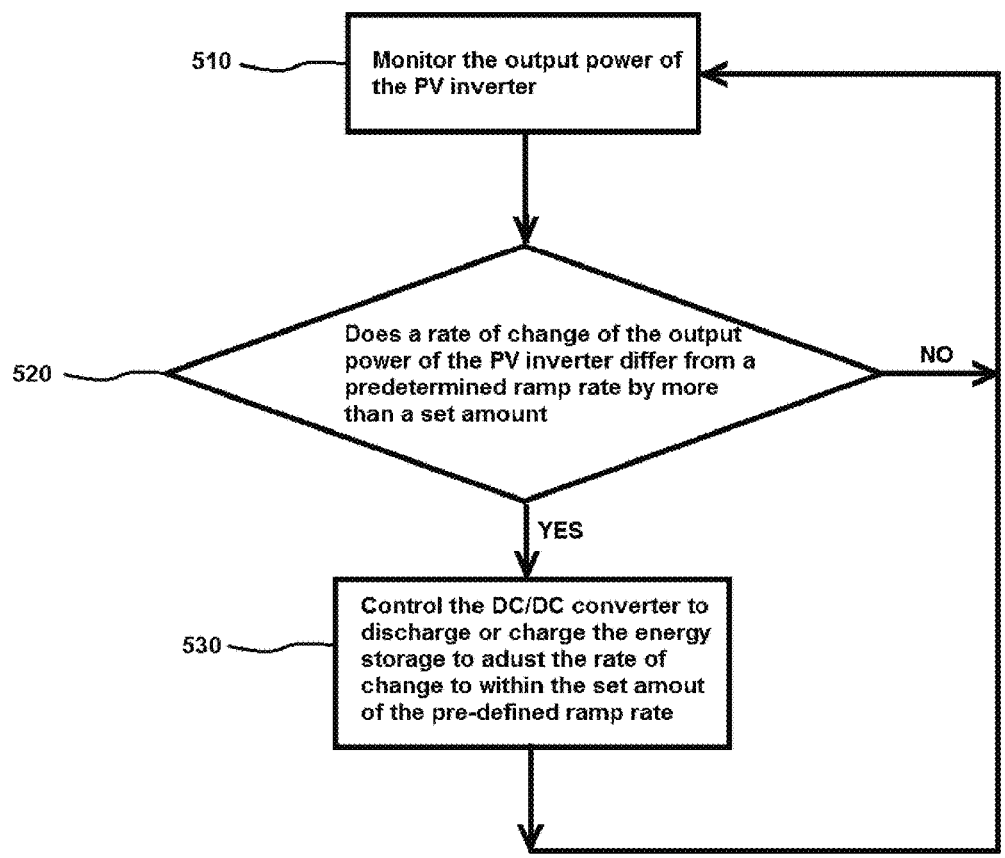
FIG. 9 is a flowchart illustrating a ramp rate control method implemented by an energy storage system according to an embodiment of the present invention.

The control system 110 controls the operation of the DC/DC converter 3 and the PV inverter 31 so that the system 100 operates in ramp control to maintain a pre-defined ramp rate. For example, in an embodiment, as shown in FIG. 9, the control system 110 is configured to:

510: When ramp control is initiated, the control system 110 monitors the output power of the PV inverter 21 to the grid. Such monitoring may take place through the use of sensors that sense the magnitude of voltage output by the PV inverter 31.

520: The control system 110 determines whether the rate of change of the power differs from a pre-defined ramp rate by a set amount.

530: when it is determined that the rate differs by the set amount, the control system 110 controls the DC/DC converter 3 to discharge or charge the energy storage 11 to slow the ramp-up or ramp-down (e.g., supplement the lost solar production to slow down the ramp rate of the output power).

In embodiments of the present invention, the DC/DC converter 3 facilitates capture of low voltage energy of a PV array 2, capture of energy lost to inverter clipping, dispatchable PV and ramp rate control. In embodiments, the DC/DC converter 3 will be used between energy storage 11 and a PV array 2. The PV array 2 may have an inverter connected with the utility AC grid. Therefore, the power flow of the converter should be bidirectional (batteries charging from PV, batteries discharging to grid via PV inverter). The battery (energy storage) voltage could be either higher or lower than or be roughly equal to the PV voltage with both directions of power flow. So, either side of the converter could be used as buck or boost.

In embodiments, the DC/DC converter 3 may also be used to interface in parallel multiple batteries of different chemistries to a single inverter, or to facilitate current sharing of batteries when new batteries are added to upgrade the capacity of an existing battery installation.

This system could also be used in microgrids where there is no utility connection.

This system could also be used to service DC loads without the need for an AC inverter.

Embodiments of the present invention make it possible to capture additional energy from solar PV installations improving the owner's return on investment (ROI). Additionally, embodiments of the present invention make it possible to time shift the dispatch of the solar PV energy production to address peaks and to dispatch energy based on Time of Day (TOD) rates.

Embodiments of the present invention allow a user to evaluate the production of a PV system based upon historic data or some simulation software (e.g. PVSyst) to determine the energy lost to inverter clipping or during low voltage array times and calculate a revised ROI once the storage and converter are added.

Although in certain exemplary embodiments discussed above, the DC/DC converter 400 is described as being coupled between energy storage and a PV array/inverter, it should be understood the present invention is not limited to this application. It will be readily understood to a person of ordinary skill in the art that embodiments of the present invention are suitable for additional applications, such as applications where DC/DC conversion is required with overlapping voltages on the first and second input/output sides. Additional examples include back up power in variable frequency drive (VFD) applications. The DC/DC converter may be interfaced with a VFD's DC bus. When the grid voltage is present, the DC bus voltage is established by the grid and the VFD is feeding the motor. When the grid goes away (e.g., a power outage), the DC/DC converter can hold up the DC bus by discharging the batteries into the VFD, allowing the VFD to run without interruption.

It will be apparent to those skilled in the art that various modifications and variations can be made to the disclosed power system without departing from the scope of this disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. A power system for capturing low voltage energy from a power source, the power system comprising:
 the power source coupled to a DC bus;
 a DC/DC power converter coupled to the DC bus and an energy storage device;
 a power inverter coupled to the DC bus and an AC bus, wherein the power inverter has a wake up, or minimum operational, voltage being a voltage magnitude that a voltage at the DC bus must reach for the power inverter to be operational; and
 a control system, the control system comprising one or more controllers configured to:
  monitor a voltage produced by the power source;
  determine whether the power source is producing a voltage greater than a first predetermined threshold, wherein the first predetermined threshold corresponds to an available power level that's equal to or greater than expected losses in the DC/DC power converter;
  determine whether the power source is producing a voltage less than a second threshold when it is determined that the power source is producing a voltage greater than the first predetermined threshold, wherein the second predetermined threshold is equal to the wake up voltage of the power inverter;
  when it is determined that the power source is producing a voltage between the first threshold and the second threshold:
   control the DC/DC power converter to operate in an MPPT mode and store energy generated by the power source in the energy storage device; and
   control the power inverter not to operate in an MPPT mode; and
  when it is determined that the power source is producing a voltage greater than or equal to the second threshold:
   control the power inverter to operate in an MPPT mode and supply the energy generated by the power source to a power grid through the AC bus; and
   control the DC/DC power converter not to operate in an MPPT mode.

2. The power system of claim 1, wherein the voltage produced by the power source is monitored continuously, and the control system continuously controls the DC/DC power converter and the power inverter to transition between operating in an MPPT mode and not operating in an MPPT mode.

3. The power system of claim 1, wherein in determining whether the power source is producing a voltage less than the second predetermined threshold, the control system is further configured to monitor the voltage at the DC bus.

4. The power system of claim 3, further comprising a sensor sensing the voltage at the DC bus and transmitting the sensed voltage to the power system.

* * * * *